United States Patent [19]

Sieber

[11] 4,450,963

[45] May 29, 1984

[54] PORTABLE PROTECTIVE HOUSING FOR SENSITIVE APPARATUS SUCH AS ELECTRICAL AND ELECTRONIC EQUIPMENT

[75] Inventor: Willi Sieber, Feuerthalen, Switzerland

[73] Assignee: Edak AG, Switzerland

[21] Appl. No.: 386,306

[22] Filed: Jun. 8, 1982

[51] Int. Cl.³ .................... B65D 81/10; B65D 85/38; B65D 25/02

[52] U.S. Cl. .................................. 206/521; 206/583; 217/53

[58] Field of Search ............... 206/521, 583, 593, 591; 217/53; 220/DIG. 3, 376

[56] References Cited

U.S. PATENT DOCUMENTS

| | | | |
|---|---|---|---|
| 2,209,403 | 7/1940 | Kittner et al. | 220/DIG. 3 |
| 2,746,824 | 5/1956 | Bond | 217/53 |
| 4,087,003 | 5/1978 | Adamek | 206/583 |

Primary Examiner—William T. Dixson, Jr.
Attorney, Agent, or Firm—McGlew and Tuttle

[57] ABSTRACT

A housing for sensitive apparatus comprises an outer housing having an opening on at least one side with a frame extending around the opening which has a sealing ring groove and including an interior apparatus carrying frame member disposed within the housing in spaced relationship to the wall and advantageously supported for example on shock absorbing elements. The interior apparatus frame member has a frame disposed around an open side which faces the open side of the housing and this frame also has a sealing ring groove defined around its periphery. The sealing member extends between the housing frame and the interior apparatus carrying frame member frame and it includes a flexible bellows portion extending between the two frame members and ring portions which are disposed in the respective ring grooves of the associated housing frame and apparatus carrying frame member.

9 Claims, 6 Drawing Figures

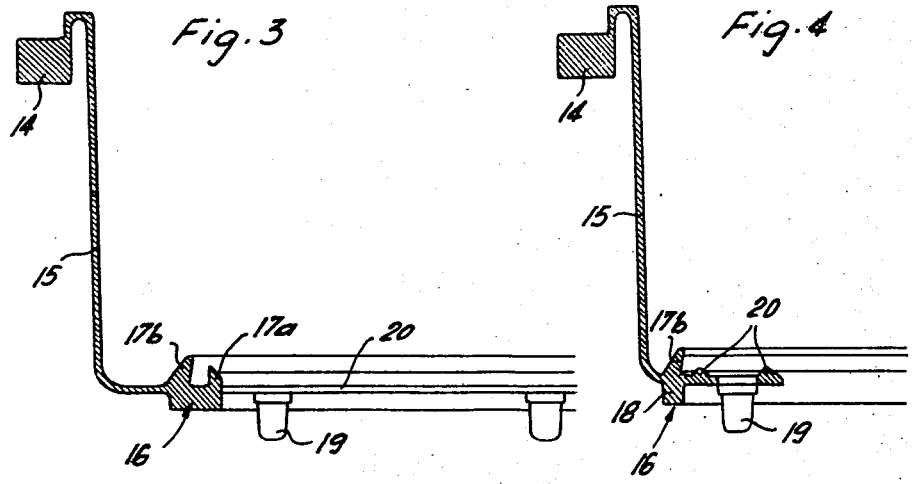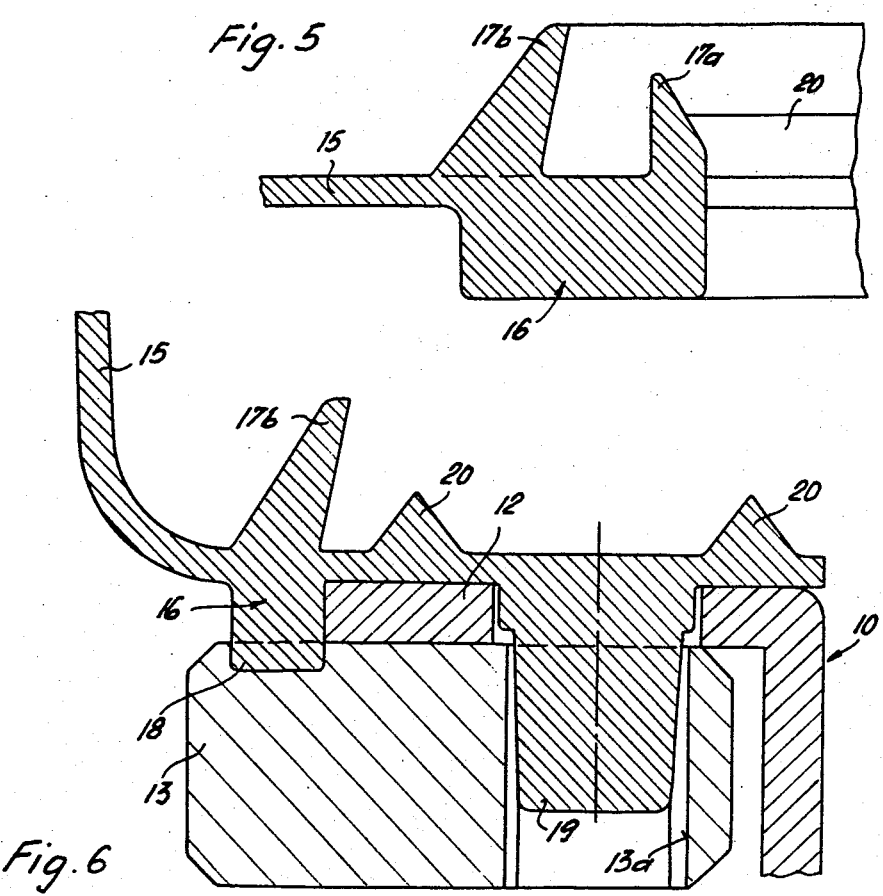

PORTABLE PROTECTIVE HOUSING FOR SENSITIVE APPARATUS SUCH AS ELECTRICAL AND ELECTRONIC EQUIPMENT

FIELD AND BACKGROUND OF THE INVENTION

This invention relates in general to protective containers and in particular to a new and useful protective housing for sensitive equipment such as electrical and electronic apparatus.

The invention relates to a portable protective housing for electrical and electronic apparatus. If such apparatus are intended, for example, for military purposes, research or in similar use under extreme mechanical and-/or climatic conditions, it is known to accommodate them in splash-tightly closable and vibration proof box-like housings. Usually, such protective housings comprise a self-supporting, box-shaped shell which has a front opening closable with a cover and in which a frame suspended from vibration absorbers is provided for receiving the apparatus to be introduced or removed through the front opening, with sectional surrounds of the shell of the frame carrying each a sealing ring.

In many instances, it has been found disadvantageous that even though the front opening of the shell can be satisfactorily tightly closed by the cover, with the cover removed, i.e. with the apparatus accessible for use, the inside of the shell is no longer tightly closed. Then, since the supporting frame, already for reasons of cooling the apparatus, is not a tight enclosure and is usually even provided with perforations, a protection of the apparatus against weather, dirt penetration, is no long ensured.

The present invention includes a housing for sensitive apparatus which comprises an outer housing part having an opening on at least one side with a housing frame surrounding the opening and an inner housing part or interior apparatus carrying frame member which is disposed within and spaced from the interior of the housing and has an open side facing the housing opening which has a frame extending around it and with sealing ring groove being defined in the frame. An integrally formed sealing member includes sealing ring portions which engage in the respective sealing grooves of the housing and the interior member and an intermediate bellows portion which extends therebetween.

The sealing bellows spanning the front gap between the shell and frame and extending between the two sealing rings which are designed as bulked rims thereof, makes sure even with the cover removed, that the intermediate space between the shell and the frame remains tightly closed, while the sealing ring fixed to the frame seals the slide-in opening thereof by cooperating with the front plate of the apparatus by which the apparatus is secured to the frame.

In order not to hinder the movements of the frame, which are made possible by the suspension from the vibration absorbers, the sealing bellows is amply dimensioned as to the distance between the sealing rings in the rest position of the frame. This also prevents the bellows, which is made of rubber or plastic for example, from being locally overstressed, particularly in the transition zones to the fixed sealing rings, even during strong vibrations of the frame.

Accordingly, it is an object of the invention to provide a housing for sensitive apparatus which comprises an interior apparatus supporting frame disposed within and spaced from the interior walls of an outer housing which has an opening on a side thereof facing an opening of the housing and wherein both the housing and the interior member have frames extending around the openings with sealing grooves defined in the frames and including an integrally formed sealing member having ring portions extending in the sealing grooves of the respective housing and interior member and an intermediate bellows portion extending therebetween.

A further object of the invention is to provide a portable protective housing which is simple in design, rugged in construction and economical to manufacture.

The various features of novelty which characterize the invention are pointed out with particularity in the claims annexed to and forming a part of this disclosure. For a better understanding of the invention, its operating advantage and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 3 and 4 are sectional views of respective long and short sides of the sealing element used in the container of FIG. 1;

FIGS. 5 and 6 are enlarged sectional views of the elements shown in FIGS. 3 and 4 respectively.

DESCRIPTION OF THE PREFERRED EMBODIMENTS

Figure 1:
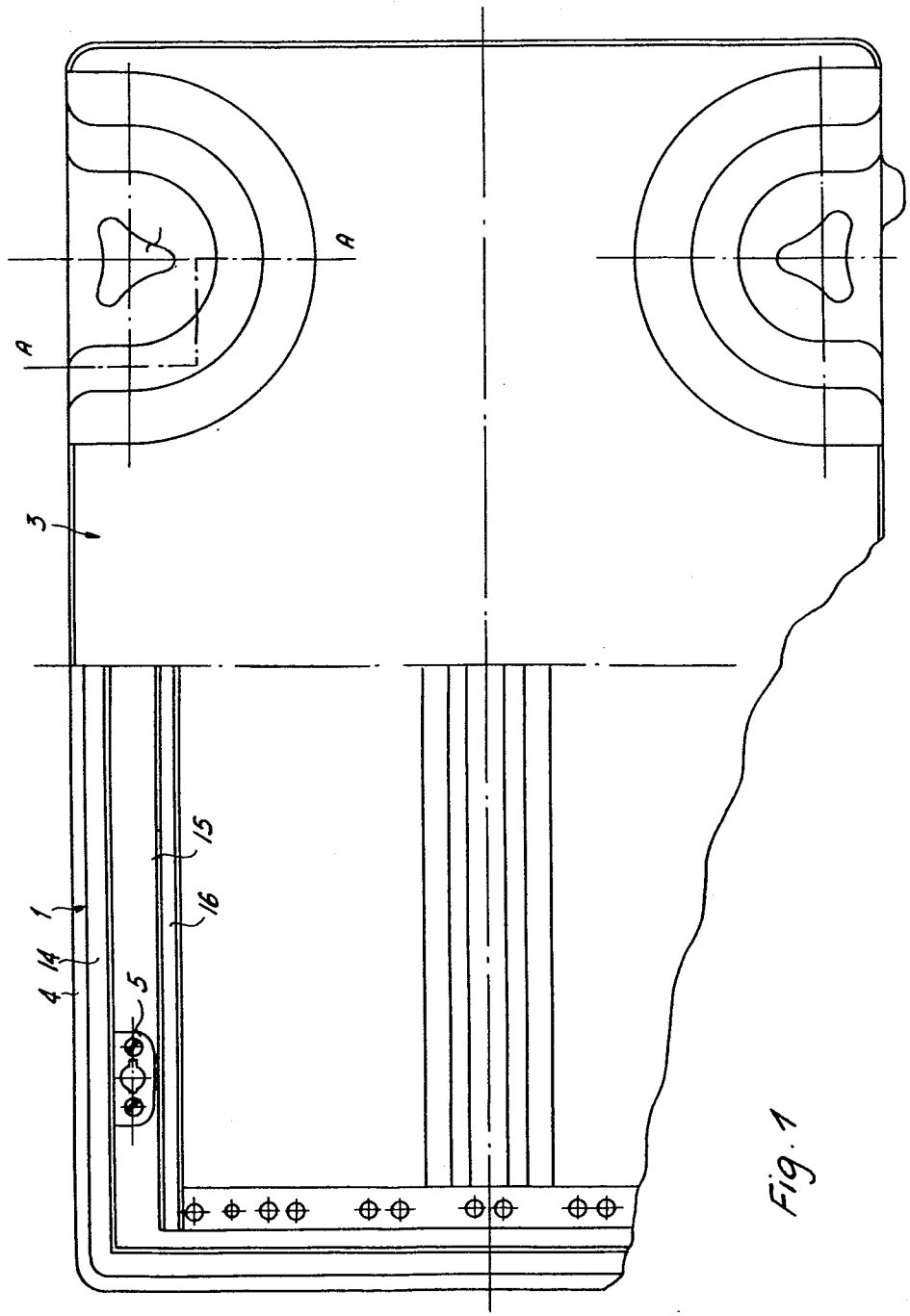
FIG. 1 is a front view partly broken away of a portion of the housing constructed in accordance with the invention.

Referring to the drawings particularly the invention embodied therein in the drawings, comprises a housing generally for sensitive apparatus which comprises the outer housing portion 1 with an opening on at least one side and which has a housing frame 4 with a sealing ring groove defined therein which is arranged around an open side of the housing. An interior apparatus carrying frame member 10 is disposed within the outer housing 1 and spaced from the interior of the housing interior walls. The apparatus carrying frame member 10 has an opening facing the housing opening with a member frame 11. The member frame 11 has a sealing ring groove which extends around the opening of the interior apparatus carrying frame member. An integrally formed sealing member includes ring portions 14 and 16, an interconnecting bellows portion 15 and it extends between the frame of the exterior housing and the frame of the interior apparatus carrying frame member. The ring portions of the sealing member 14 and 16 fit into respective grooves of the frame elements 4 and 11 respectively.

Figure 2:
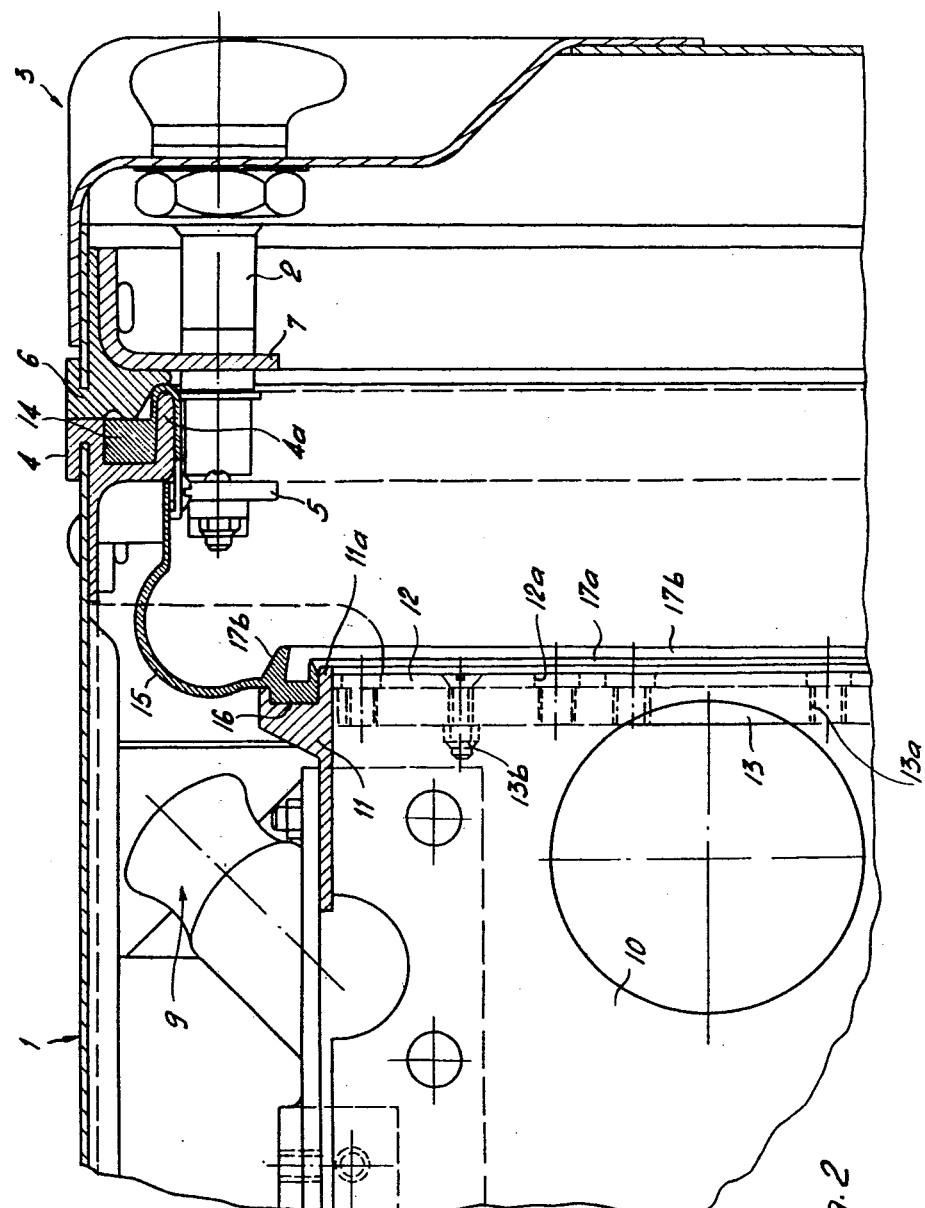
FIG. 2 is a partial sectional view taken along the lines A—A of FIG. 1.

The shown protective housing comprises the box-shaped self-supporting metallic shell 1 and a front cover 3 which can be fixed to the shell by means of sunk-in lock knobs 2. Swing-out handles (not shown) in sunk-in position are provided in the side wall of shell 1, and the bottom of the shell is formed with supporting ribs. The sectional surround or frame 4 of shell 1 is provided on the front side with the peripheral groove which is bounded toward the inside by a projecting flange 4a. Secured to surround 4 are locking plates 5 for engaging the lock knobs 2, which extend through angle plates 7 secured to a sectional surround or frame 6 of cover 3. The receiving frame 10 is provided within shell 1 in spaced relationship therewith and suspended from eight diagonally extending vibration absorbers or supports 9 (FIG. 2). Vibration absorbers 9 function even with cover 3 off. Frame 10 is of standard size and the respective apparatus assembly to be received therein can be introduced through a front opening which is in a position offset rearwardly relative to the open side of shell 1. Frame 10 is provided with the sectional surround or frame 11 which, on the long sides, is formed with the groove bounded inwardly by a projecting flange 11a. The short sides of surround 11 form a flange 12 which is provided with a row of holes 12a. To the underside of short-side flange 12, a strip 13 with tapped holes 13a is secured by screws 13b. Holes 13a are aligned with holes 12a of short-side flange 12.

In the peripheral groove having a rectangular cross section of sectional surround 4 of shell 1, sealing ring 14 is fitted and fixed by an adhesive. Sealing ring 14 forms a bulked rim of relatively thin-walled sealing bellows 15 having its outer rim also bulked to form the other sealing ring 16. The long sides of sealing ring 16 which is conformable to frame 10, are fitted and fixed by an adhesive in the front groove of sectional surround 11 of frame 10 and provided with inner and outer sealing lips 17a, 17b, respectively. The outer sealing lip 17b, which is higher and inclined slightly inwardly extends over the entire circumference of sealing ring 16, thus also along the short sides thereof. On these short sides, sealing ring 16 engages by a strip 18 on the free edge of short-side flange 12 of surround 11, and, on the other hand, is anchored by means of underside pins 19, which extend through flange holes 12a into a portion of holes 13a of strip 13. The relatively broad front side of these short-side sealing lip portions is in addition formed with two ribs 20 having a triangular cross section.

As shown in FIGS. 3 and 4, the sealing element 14,15,16 made in one piece of rubber or a suitable plastic is manufactured in the shape of a bottomless pan in which the bottom rim is formed by sealing ring 16, the slightly slanting walls by bellows 15, and the upper rim by sealing ring 14, with the shape of the two sealing rings 15,16 corresponding to that in their position in use, while the bellows 15 is manufactured in stretched position. After inserting and fixing sealing rings 14 and 16 in place in the groove of surround 4 of shell 1 and the groove of surround 11 and flange 12 of frame 10 (in rest position), bellows 15 is slightly bulged.

As shown in FIG. 2, the bellows-like sealing element 14,15,16 made in one piece closes the space between shell 1 and frame 10 to the outside quite satisfactorily. With this seal in place, the apparatus (not shown) can be introduced into frame 10 as desired, and firmly screwed by the projecting rim of its front plate, which corresponds to the standard size of the frame and will apply to sealing ring 16 on all sides, to strip 13. Thereby not only the space between the shell and the frame, but also the receiving space of frame 10 and thus the apparatus accommodated therein are perfectly sealed to the outside. Bellows 15 which, due to its oversize length, is bulged in its position of use, does not hinder in any way movements which frame 10 suspended from vibration absorbers might perform relative to shell 1, since these always relatively small movements cannot unduly stretch the bellows at any location. When cover 3 is in place, its frame 6, which has a sealing edge, sealed against ring 14 to seal the cover.

Consequently, the apparatus is accommodated tightly and in a vibration-proof manner in shell 1 not only with cover 3 in place, but is satisfactorily protected against penetration of dust, splash water, etc. also with the cover removed, due to the one-piece sealing element 14,15,16. Sealing lips 17a,17b and sealing ribs 20 ensure the tight contact between the front plate rim of the apparatus and the sealing element even in instances where this rim, for lack of space, as in the shown embodiment, can be screwed only to the short sides of frame 10.

While specific embodiments of the invention have been shown and described in detail to illustrate the application of the principles of the invention, it will be understood that the invention may be embodied otherwise without departing from such principles.

What is claimed is:

1. A housing for sensitive apparatus comprising an outer housing having an opening on at least one side, said housing having a housing frame surrounding the opening which has a housing sealing ring groove therein facing outwardly of said opening, an interior apparatus carrying frame member disposed within said housing and spaced from the interior of said housing and having an open side facing the opening of said housing, said interior apparatus carrying frame member including a frame surrounding the opening with a member sealing ring groove defined in said frame and facing outwardly of said opening, a sealing member extending between said housing frame and said member frame and including ring portions disposed in and fixed to said respective ring grooves of said frames and an intermediate bellows portion extending between said ring portions, each of said ring portions having a sealing surface facing outwardly of said opening, means for suspending said interior apparatus carrying frame member in the interior of said housing comprising resilient vibration absorbing elements, said sealing member bellows portion being substantially flat and stretched when formed and being wide enough to permit movement of said interior apparatus carrying frame member relative to said housing to allow for vibration and to have an outwardly gently curved cross sectional shape with respect to said opening when said ring portions are fixed to said ring grooves, and a cover having a cover frame with an edge for engaging on and all the way around said sealing surface of said ring portion in said ring groove of said housing frame.

2. A housing according to claim 1, wherein said ring portions of said sealing members are fixed to within the sealing grooves of said housing frame and said internal apparatus carrying frame member by adhesive.

3. A housing according to claim 2, wherein said housings have long and short sides, said sealing ring portion of said interior apparatus carrying frame member frame being fixed on its long side by an adhesive in said ring groove of the associated frame, said ring having rows of pins integral therewith and said frame having holes into which said pins extend.

4. A housing according to claim 1, wherein said bellows has a length which exceeds spacing between said ring so as to cause said bellows portion to bulge between said rings and to not obstruct any movement of said interior apparatus carrying frame member relative to said housing.

5. A housing according to claim 1, wherein said sealing member includes an inner sealing ring portion associated with said sealing ring groove of the interior apparatus carrying frame member frame to provide it with an outer peripheral inwardly slanting sealing lip on one side of said sealing ring and an inner sealing lip portion of smaller height and spaced from the outer sealing lip and including on a side thereof away from said bellows spaced parallel sealing ribs of triangular cross section with an opposite side having a pin configuration extending in an opposite direction.

6. A housing for sensitive apparatus comprising:
an outer housing (1) having an opening at one side thereof, said housing having a housing frame (4) surrouding said opening with a housing sealing ring groove therein facing outwardly of said opening, said housing frame including a flange (4a) bordering an inner part of said housing sealing ring groove around a periphery of said opening and projecting outwardly of said opening;
an interior apparatus carrying frame member (10) disposed within said housing and spaced inwardly from an interior of said housing, an having an open side facing said opening of said housing, said interior apparatus carrying frame member including a frame (11) surrounding said open side with a member sealing ring groove defined in said frame facing outwardly of said open side;
a sealing member extending around said housing frame and said member frame, said sealing member including a first ring portion (14) having a substantially rectangular cross-section and a portion (14) having a substantially rectangular cross-section and an outer sealing surface facing outwardly of said opening, said sealing member including a second ring portion (16) disposed in and fixed to said member sealing ring groove, said second ring portion having an outer surface facing outwardly of said opening, said sealing member further including a bellows (15) connected between said first and second ring portions, said bellows extending over said flange and having a substantially flat-stretched shape when formed with a length greater than a distance between said housing and member sealing ring grooves to form an outwardly gently curved cross-sectional shape with respect to said opening when said first and second ring portions are fixed to said housing and frame sealing ring grooves respectively;
a plurality of vibration absorbing elements connected between said interior apparatus carrying frame member and said housing for supporting said frame member in said housing and for absorbing vibrations, the length of said bellows being sufficiently long to accommodate any relative displacement of said frame member and said housing; and
a cover for covering said opening having a cover frame with an edge for engaging on and all the way around said outer surface of said first ring portion.

7. A housing according to claim 6, wherein said apparatus carrying frame member has a pair of long sides and a pair of short sides, said second ring portion including a pair of spaced sealing lips (17a, 17b), tapering toward each other in the direction outwardly of said opening and extending from said outer surface of said second ring portion, said lips extending over said two long sides of said frame member, an outer one of said lips (17b) also extending on said short sides of said frame member, said second ring portion including a pair of spaced apart triangular projections (20,20) disposed on said outer surface thereof over said short sides of said frame member whereby apparatus to be engaged in said frame member is sealable with said sealing lips and said triangular projections.

8. A housing according to claim 6, wherein said frame member includes a projection (11a) projecting outwardly of said opening and bounding an inner part of said member sealing ring groove, said short sides of said frame member having a plurality of holes therein, said second ring portion including a plurality of pins (19) extending into at least some of said holes, said pins extending inwardly of said opening and disposed between said triangular projection.

9. A housing according to claim 6 wherein each of said vibration absorbing elements is connected between said interior apparatus carrying frame member and said housing for supporting said frame member and for absorbing vibrations with said cover covering said opening and without said cover covering said opening, each vibration absorbing element extending diagonally between said interior apparatus carrying frame member and said housing.

* * * * *

UNITED STATES PATENT AND TRADEMARK OFFICE
CERTIFICATE OF CORRECTION

PATENT NO. : 4,450,963

DATED : May 29, 1984

INVENTOR(S) : Willi Sieber

It is certified that error appears in the above-identified patent and that said Letters Patent is hereby corrected as shown below:

On the title page Insert

-- (30) Foreign Application Priority Data

June 15, 1981    Switzerland    3922/81 --

Signed and Sealed this

Twenty-third Day of October 1984

[SEAL]

Attest:

GERALD J. MOSSINGHOFF

Attesting Officer    Commissioner of Patents and Trademarks